United States Patent [19]
Johnson

[11] 4,313,631
[45] Feb. 2, 1982

[54] LATCH FOR MODULE BUILDER

[75] Inventor: Don R. Johnson, Lubbock, Tex.

[73] Assignee: Harris & Thrush Manufacturing Company, Wolfforth, Tex.

[21] Appl. No.: 99,882

[22] Filed: Dec. 3, 1979

[51] Int. Cl.³ .............................................. E05C 3/30
[52] U.S. Cl. ................................... 292/201; 100/100
[58] Field of Search ................. 100/100, 255; 49/280; 292/201, 144

[56] References Cited
U.S. PATENT DOCUMENTS

| | | | |
|---|---|---|---|
| 3,099,438 | 7/1963 | Fritz | 49/280 X |
| 3,440,764 | 4/1969 | Cover | 49/280 |
| 3,860,288 | 1/1975 | Martin et al. | 49/280 X |
| 3,901,142 | 8/1975 | Wood | 100/100 |
| 3,941,047 | 3/1976 | Orlando et al. | 100/100 |
| 4,155,586 | 5/1979 | Flynn | 292/304 X |
| 4,170,934 | 10/1979 | Oosterling et al. | 100/100 |
| 4,241,653 | 12/1980 | Fagundes et al. | 100/100 |

Primary Examiner—Richard E. Moore
Attorney, Agent, or Firm—Wendell Coffee

[57] ABSTRACT

A latch for the door of a module builder includes a plate attached to the door and a notched latch bar pivoted to the frame of the module builder. A hydraulic latch cylinder raises the latch bar at the same time pressure is applied to a main door cylinder to open the door. An orifice is placed adjacent to the main door opening cylinder to make certain sufficient hydraulic fluid is applied to the latch opener and also to limit the speed by which the door is closed. The latch cylinder is attached to a floating bar so that upon the door closing, the latch bar can rise to be latched closed even though the latch cylinder is closed.

2 Claims, 9 Drawing Figures

U.S. Patent  Feb. 2, 1982  Sheet 1 of 2  4,313,631
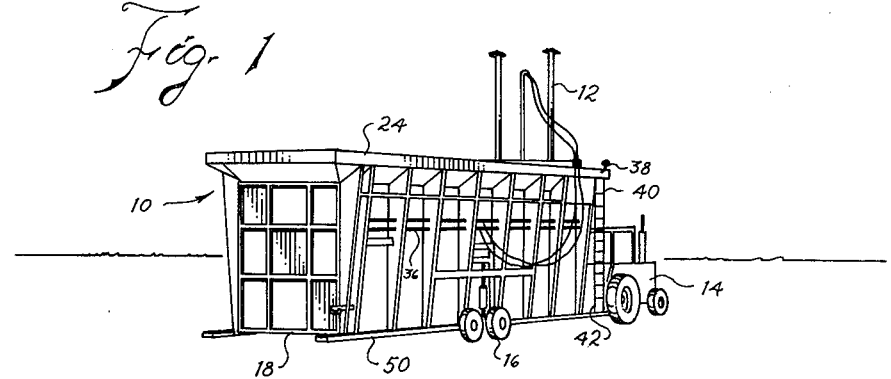
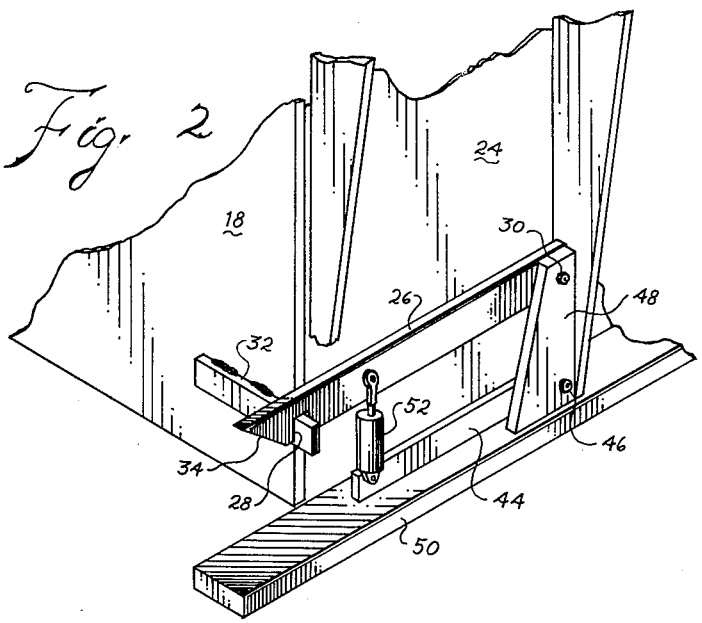
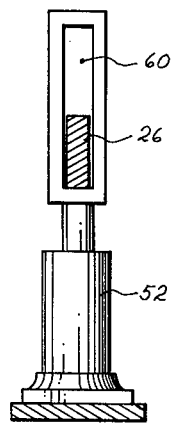
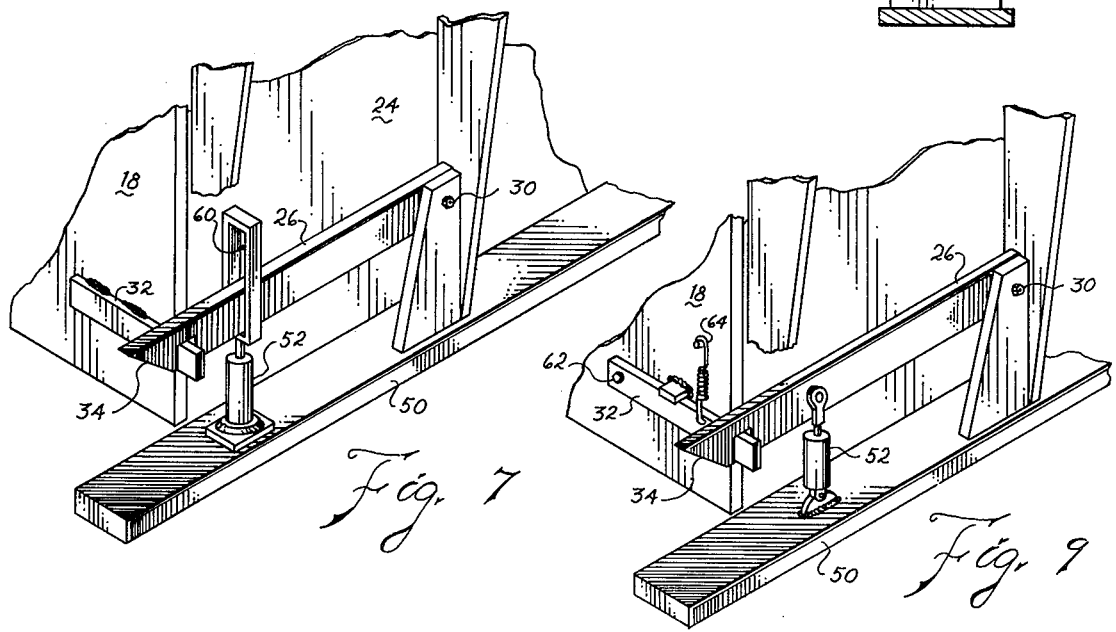

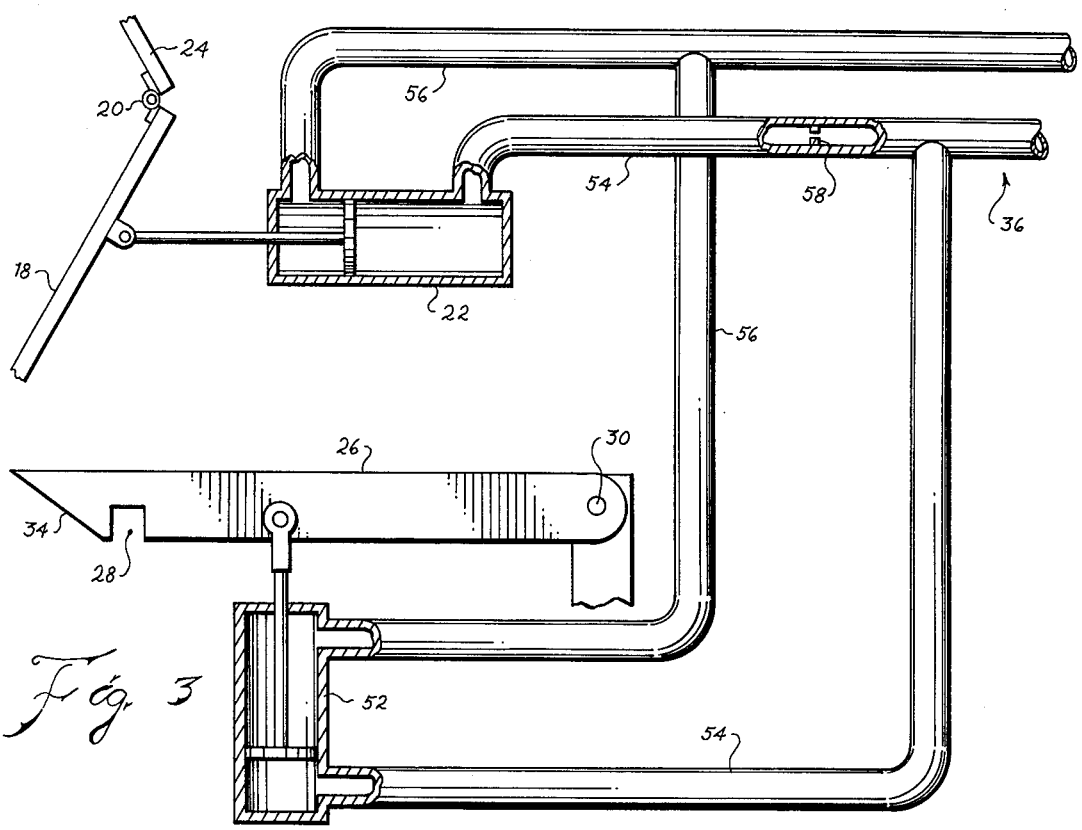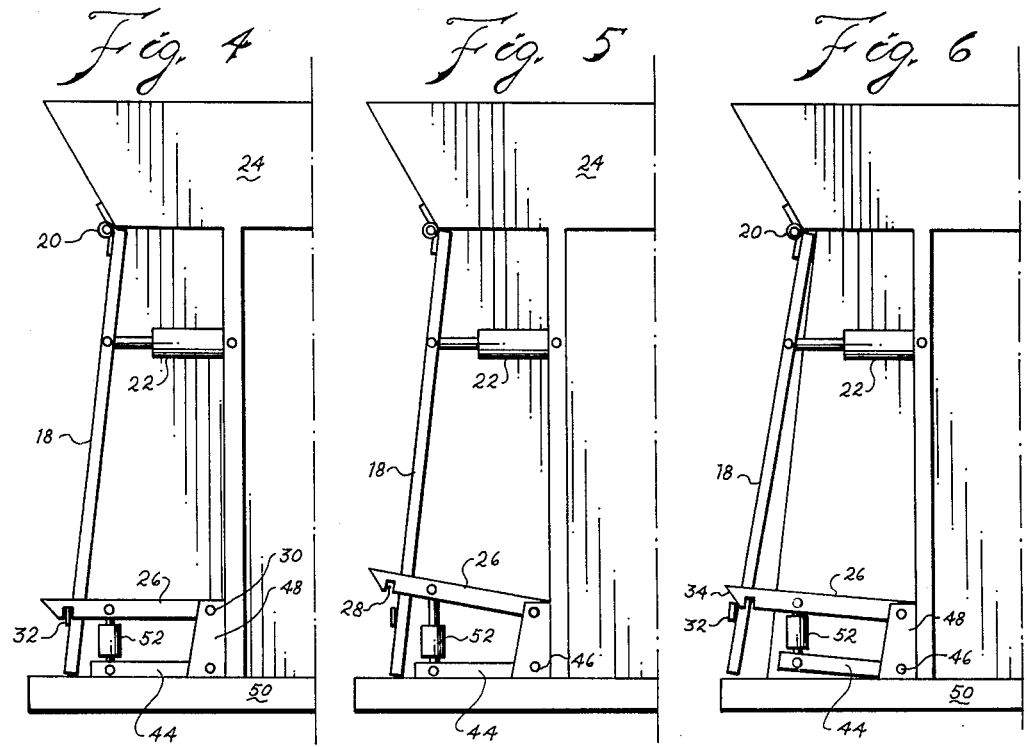

LATCH FOR MODULE BUILDER

BACKGROUND OF THE INVENTION

(1) Field of the Invention

This invention relates to latches and more particularly to the latch for a press such as a cotton module builder.

(2) Description of the Prior Art

Before the application was filed, applicant was aware of the following U.S. Pat. Nos. 3,440,764 COVER, 3,901,142 WOOD, 3,941,047 ORLANDO et al., 4,155,586 FLYNN.

ORLANDO et al. discloses a cotton module builder. The builder includes a back door or gate which is hinged at its top to the frame of the module builder. Units built according to this patent are commecially on the market. The back door is raised and lowered by a hydraulic cylinder. The door is held in the closed position by a latch which is operated by a hand lever. I.e., any time the door is to be opened so that the module builder can be moved, it is necessary for the operator to leave his operating station, walk to the rear of the unit to open the back door.

COVER discloses a hydraulic-mechanical system. It discloses a tailgate apparatus wherein the tailgate is operated by hydraulic cylinders. Through a concentric device, rotation of a shaft first, through pitmans, unlatches the latch and thereafter begins raising the door.

WOOD discloses a complex cable system depending upon mechanical connections of the cables for gate latching and opening.

FLYNN discloses a latch operated by a cylinder and a door raising equipment controlled by a cylinder. A hydraulic sequencing control valve is used to first operate the latch cylinder to unlatch the tailgate and then to operate the door cylinder to raise the door (or tailgate).

SUMMARY OF THE INVENTION

(1) New and Different Functions

I have invented a latching mechanism which is extremely simple and, therefore, trouble free. Basically, the system has two cylinders which are connected to the same hydraulic lines. The latch cylinder operates first because of restrictions in the line to the door cylinder. Alternatively, the latch cylinder could be made to operate first by the diameter of the cylinder relative to the force against it. A lost motion device or second movement is provided so that when te door is closing, the entire latch unit is free to move for closure. In the preferred embodiment this movement is accomplished by having the base of the latch operating cylinder mounted upon a floating bar.

By placing a flow restriction device in the inlet of the door operating cylinder two important functions are provided. I.e., it both insures that the latch cylinder will operate first to unlatch the door and also it limits the rate by which the door moves when it is being closed.

Thus, it may be seen that the function of the total combination far exceeds the total of the functions for the individual elements such as cylinders, orifices, latches, etc.

(2) Objects of this Invention

An object of this invention is to make cotton modules.

Another object of this invention is to provide an improved door opening and latch mechanism.

Further objects are to achieve the above with a device that is sturdy, compact, durable, lightweight, simple, safe, efficient, ecologically compatible, energy conserving, and reliable, yet inexpensive and easy to manufacture, install, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a perspective view of a cotton module builder embodying my invention.

FIG. 2 is an perspective view showing an enlarged portion of FIG. 1, particularly illustrating the latch mechanism.

FIG. 3 is a schematic representation of the hydraulic connections.

FIGS. 4, 5 and 6 are schematic representations of the operation in sequence with FIG. 4 showing the door latch closed, FIG. 5 showing the door being opened with the latch open but before the door begins to move and FIG. 6 showing the door as it is closing with the latch being raised by the cam on its forward surface.

FIG. 7 is an enlarged perspective view showing the same portion of the unit similar to FIG. 2 showing a second embodiment.

FIG. 8 is a section detail of the embodiment of FIG. 7.

FIG. 9 is an enlarged perspective view similar to FIGS. 2 and 7 showing a third embodiment.

DESCRIPTION OF THE PREFERRED EMBODIMENTS

Referring to the drawings, there may be seen a typical cotton module builder 10. As may be seen, it has tramper mechanism 12 to compact cotton therein. The power for the tramper is conveniently supplied by hydraulic pump upon farm tractor 14. Therefore, the farm tractor may be considered to be a source of hydraulic fluid to the builder. Also, hydraulics will be used to lower the wheels 16 thus raising the builder 10 for movement from one location to another. However, before the unit may be moved the tailgate or door 18 must be raised. The door is attached to the frame by hinge 20 extending across the top of the door. It is normally raised by hydraulic door cylinder 22 which is attached at one end to frame 24 of the module builder and at the other to the door 18. The door, in the closed position, is held in the closed position by latch bar 26 which has notch 28 in it and which is pivoted by pin 30 to the frame. The notch 28 in the notch bar 26 cooperates with plate 32 on the door 18. Cam means 34 in the form of a bevel surface 34 on the front of the bar 26 causes the bar to move upward as the plate 32 moves against it on the closing of the door.

Hydraulic lines 36 extend from valves 38 at the operator station 40 to the door cylinder 22. Other lines, not shown in the drawing for clarity, extend from the farm tractor 14 to the valves 38. In one regard, the valves 38 being pressurized by the farm tractor could be considered to be the source of hydraulic fluid under pressure to the door cylinder 22. The station 40 is the operator station as discussed in the prior art and has ladder 42 leading to it.

Those having ordinary skill with module builders will understand that the module builder described to this point is commercially available on the market. Also those having ordinary skill in the art will understand that there is a door cylinder 22 on each side of the door 18 and that the latch bar 26 may well have units on both sides so that it is latched on both sides of the door. However, inasmuch as these are identical they are described for only one side. As discussed above, in the prior art the latches are manually operated.

According to my invention, floating bar 44 is pivoted by pin 46 to gusset 48 below the pin 30 by which the latch bar 26 is attached to the gusset, a part of the frame 24 of the module builder. In the normal position, the floating bar 44 rests on top of runner 50, another part of the frame 24.

Latch cylinder 52 has one end structurally attached to the floating bar 44 and the other end structurally attached to the latch bar 26.

The latch cylinder 52 is fluidly connected to the hydraulic lines 36 as particularly illustrated in FIG. 3. As may be seen, there is the opening line 54 which is connected to the back side of door cylinder 22 so that as it is pressurized it will open the door 18. This is connected to the bottom side of latch cylinder 22 so that as pressure is applied thereto it opens the latch bar 26 by pushing it upward. Likewise, the closing line 56 is connected to the front side of door cylinder 22 so that pressure therein will close the door cylinder and thus the door 18 and also is attached the top side of latch cylinder 52 so the pressure therein will close the latch bar 26 or at least bring the latch bar 26 and floating bar 44 together.

An adjustable flow restriction device, such as a needle valve or a fixed flow restricting device such as orifice 58, is placed in the opening line 54 adjacent to the door cylinder 22.

Referring to FIGS. 4, 5 and 6 for the operation of the invention, FIG. 4 shows the device with the door closed and the latch closed. This would be the position of the elements as cotton was dumped into the module builder 10 and be tramped down by the tramper 12.

Then, when the door was to be opened by proper operations of one of the valves 38, pressure would be applied to the opening line 54. Because of the flow restrictor 58, this hydraulic pressure would first cause the latch cylinder 52 to expand or open, opening the latch bar 26. This condition is seen in FIG. 5. Continued pressure in the opening line 54 would cause the door cylinder 22 to open also opening the door 18.

When it is desired to close the door the closing line 56 would be pressurized and would cause the latch cylinder to close bringing the latch bar 26 down. The rate at which the door is closed is limited by the flow restrictor or orifice 58.

When the door was nearly closed, the plate 32 would strike the cam surface 34 and raise the latch bar 26 as seen in FIG. 6. Continued movement of the door 18 would bring the latch plate 32 to the notch 28 thus latching or locking the door 18 in the closed position so that it could again withstand the pressures of cotton being packed by the tramper 12.

Thus, it may be seen that I have provided a mechanism whereby the latch may be remotely opened and closed with the same valve as is used to open and close the door 18. No special sequencing valves are necessary nor is any finely timed clockwork mechanisms.

Analysis of the mechanism will show that basically there are five elements or parts, i.e., the frame, the door, the plate, the latch bar and the latch cylinder. The latch bar and plate form an assembly. It will be understood that the latch bar could be on the door along with the hydraulic cylinder and the plate could be upon the frame, although there would have to be a relocation of cams and difficulty with extending hydraulic lines over the door. However, such a unit could be built. With the latch unit which includes the three units, i.e., (1) the latch cylinder; (2) the latch bar; and (3) the plate, in the prior art only one of them is built for movement relative to the door or the frame. I.e., normally only the latch bar moves relative to those. However, analysis will show that if two are made moveable relative to either the other three elements of the latch unit or the frame or door themselves that the unit will operate as described. E.g., in the embodiment already described, the latch bar moves relative to the frame and also the latch cylinder moves relative to the frame inasmuch as it is mounted upon floating bar 44.

As may be seen in FIG. 7, the latch bar 26 could be mounted for movement relative to the latch cylinder 52 merely by having a lost motion device between these two. This lost motion device could either be placing a floating bar so that the floating bar pushed against the latch bar 26 or it could be by having a slot as illustrated in FIG. 7. It may be seen that the top of the latch cylinder 52 pushes against the latch bar 26 but never pulls it downward. The latch bar falls by gravity. Slot 60 is attached to the top of the latch cylinder 52 rather than having it pinned to the latch bar 26 as is shown in the embodiment of FIGS. 1-6. In this instance, the bottom of the latch cylinder would be rigidly attached directly to the frame 24 of the module builder.

FIG. 8 shows yet another modification. In this instance, the latch cylinder 52 is pinned to the frame 10 as in the embodiment of FIG. 7 and also it is pinned to the latch bar 26 as in the embodiment of FIGS. 1-6. There is movement of the latch bar to the frame. However, there is no movement of the latch bar to the latch cylinder 52 nor is there movement of latch cylinder 52 to the frame 24. However, in the embodiment of FIG. 8, the plate 32 is mounted for movement to the door. This is provided by pivoting the plate 32 to the door by plate pin 62 and holding it in the normal upper position by spring 64.

Therefore, it may be seen in each of the three embodiments that two of the three elements of the latch units are moveable.

As an aid to correlating the terms of the claims to the exemplary drawings, the following catalog of element is provided:

| | |
|---|---|
| 10 builder | 38 valves |
| 12 tramper | 40 station |
| 14 farm tractor | 42 ladder |
| 16 wheels | 44 floating bar |
| 18 door | 46 pin |
| 20 hinge | 48 gusset |
| 22 door cylinder | 50 runner |
| 24 frame | 52 latch cylinder |
| 26 latch bar | 54 opening line |
| 28 notch | 56 closing line |
| 30 pin | 58 orifice |
| 32 plate | 60 slot |
| 34 cam | 62 plate pin |
| 36 hydraulic line | 64 spring |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a cotton module builder having
    a. a frame,
    b. a door hinged at its top to the frame,
    c. a knotched latch bar pivoted to the frame,
    d. a plate attached to the door to cooperate with the latch bar to hold the door closed,
    e. cam means on the latch bar for raising the latch bar as it moves into engagement with the plate,
    f. a source of hydraulic fluid under pressure,
    g. a hydraulic door cylinder interconnecting the frame and door to open the door, and
    h. hydraulic lines between the source and door cylinder; wherein the improvement comprises;
    j. a hydraulic latch cylinder having one end connected to the latch bar and the other end connected to a floating bar,
    k. said floating bar pivoted to the frame so that the floating bar and latch bar may be in parallel positions,
    m. the floating bar
        (i) limited in its downward travel, and
        (ii) below the latch bar,
    n. the latch cylinder fluidly connected to the hydraulic lines,
    o. so that pressure on the hydraulic lines to open the door also opens the latch bar by means of the latch cylinder, and
    p. pressure on the hydraulic lines to close the door also closes the latch bar through the latch cylinder.

2. The invention as defined in claim 1 with the addition of a flow restrictor in the hydraulic line adjacent to the side of the door cylinder, that side of the door cylinder being the side that forces the door open so that as pressured is applied to the lines to force the door open the latch will first be opened and further that the rate at which the door can close is limited.

* * * * *